(12) United States Patent
Zhou et al.

(10) Patent No.: US 12,027,139 B2
(45) Date of Patent: Jul. 2, 2024

(54) METHOD AND APPARATUS FOR DETECTING AMBIENT LIGHT UNDER DISPLAY SCREEN AND ELECTRONIC DEVICE

(71) Applicant: SHENZHEN GOODIX TECHNOLOGY CO., LTD., Guangdong (CN)

(72) Inventors: Luming Zhou, Guangdong (CN); Xiaomei Ding, Guangdong (CN); Xiangyu Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 95 days.

(21) Appl. No.: 17/861,004

(22) Filed: Jul. 8, 2022

(65) Prior Publication Data

US 2023/0206881 A1      Jun. 29, 2023

(30) Foreign Application Priority Data

Dec. 27, 2021   (CN) .......................... 202111618506.5

(51) Int. Cl.
*G09G 5/10*          (2006.01)
(52) U.S. Cl.
CPC ....... *G09G 5/10* (2013.01); *G09G 2320/0693* (2013.01); *G09G 2360/144* (2013.01); *G09G 2360/16* (2013.01)

(58) Field of Classification Search
CPC ............. G09G 5/10; G09G 2320/0693; G09G 2360/144; G09G 2360/16; G09G 3/3208; G09G 2310/08; G01J 1/4204
See application file for complete search history.

(56) References Cited

U.S. PATENT DOCUMENTS

2018/0063435 A1   3/2018  Cho et al.
2021/0090523 A1*  3/2021  Huang ................. G06F 3/0421
(Continued)

FOREIGN PATENT DOCUMENTS

CN         102944303 A     2/2013
CN         106462339 A     2/2017
(Continued)

*Primary Examiner* — Rodney Amadiz
(74) *Attorney, Agent, or Firm* — Scully, Scott, Murphy & Presser, P.C.

(57) ABSTRACT

A method for detecting ambient light under a display screen includes: acquiring first sampling data of a sensor under a first sampling parameter; acquiring a current main frequency of the display screen; determining whether the first sampling data is valid according to the current main frequency and a standard main frequency of the display screen; adjusting the first sampling parameter as a second sampling parameter according to the current main frequency and the standard main frequency, when the first sampling data is invalid; acquiring second sampling data of the sensor under the second sampling parameter; and determining intensity of the ambient light according to the second sampling data. The method of the present application can effectively avoid an ambient light detection error caused by the offset of the main frequency of the display screen or the sensor, and improve accuracy of the ambient light detection.

12 Claims, 3 Drawing Sheets

(56) References Cited

U.S. PATENT DOCUMENTS

| | | |
|---|---|---|
| 2021/0125550 A1 | 4/2021 | Chen |
| 2021/0125578 A1 | 4/2021 | Liu |
| 2021/0127471 A1 | 4/2021 | Wang et al. |
| 2021/0210027 A1 | 7/2021 | Chen |
| 2021/0319753 A1* | 10/2021 | Kelly .................. G09G 3/3233 |
| 2023/0214058 A1* | 7/2023 | Kallio .................. G06F 3/0421 |
| | | 345/175 |

FOREIGN PATENT DOCUMENTS

| | | |
|---|---|---|
| CN | 107941330 A | 4/2018 |
| CN | 110809878 A | 2/2020 |
| CN | 111754929 A | 10/2020 |
| CN | 112033527 A | 12/2020 |
| CN | 112449026 A | 3/2021 |
| CN | 112687232 A | 4/2021 |
| CN | 112714205 A | 4/2021 |
| CN | 113077738 A | 7/2021 |
| CN | 113096614 A | 7/2021 |
| JP | 2004045466 A | 2/2004 |
| WO | 2022101177 A1 | 5/2022 |

\* cited by examiner

METHOD AND APPARATUS FOR DETECTING AMBIENT LIGHT UNDER DISPLAY SCREEN AND ELECTRONIC DEVICE

This application claims priority to Chinese Patent Application No. 202111618506.5, filed on Dec. 27, 2021, which is hereby incorporated by reference in its entirety.

TECHNICAL FIELD

The present application relates to the technical field of ambient light detection, and more particularly, to a method, apparatus and an electronic device for detecting ambient light under a display screen.

BACKGROUND

With the development of electronic devices and mobile terminals, pursuit of a larger display screen size and a higher screen-to-body ratio has become a current development trend of the electronic devices. In order to meet the higher screen-to-body ratio, a sensor originally disposed next to a display screen, such as a fingerprint identification sensor and a light sensor, is usually transferred to be under the screen to reduce space outside the display screen. The light sensor can detect ambient light in the environment where an electronic device is located, so that the electronic device can realize a function such as self-adjustment of screen brightness based on the ambient light. The light sensor disposed under the screen can not only detect ambient light, but also detect leaked light when the display screen emits light, which results in inaccurate ambient light detection results.

Therefore, how to reduce influence of leaked light of a screen on ambient light detection is an urgent technical problem to be solved.

SUMMARY

Embodiments of the present application provide a method, apparatus and an electronic device for detecting ambient light under a display screen, which can dynamically monitor whether an offset in a main frequency of the display screen or a sensor occurs, and adjust the main frequency of the sensor in time when the offset occurs so that the main frequency of the display screen keeps consistent with the main frequency of the sensor, so as to avoid an ambient light detection error caused by the offset of the main frequency of the display screen or the sensor, that is, to ensure that leaked light of the display screen is accurately removed, and accuracy of ambient light detection is improved.

In a first aspect, provided is a method for detecting ambient light under a display screen, including: acquiring first sampling data of a sensor under a first sampling parameter; acquiring a current main frequency of the display screen; determining whether the first sampling data is valid according to the current main frequency and a standard main frequency of the display screen; adjusting the first sampling parameter as a second sampling parameter according to the current main frequency and the standard main frequency, when the first sampling data is invalid; acquiring second sampling data of the sensor under the second sampling parameter; and determining intensity of the ambient light according to the second sampling data.

In an embodiment of the present application, by obtaining a current main frequency of a display screen, it can be judged whether an offset in the main frequency of the display screen occurs according to the current main frequency and a standard main frequency, so as to determine whether current sampling data (i.e., first sampling data) is valid, and adjust sampling parameters of a sensor when the current sampling data is determined to be invalid, so that the sensor samples ambient light based on new sampling parameters, so as to correct the offset in the main frequency of the display screen by adjusting the sampling parameters, avoid an ambient light detection error caused by the offset, and improve accuracy of the ambient light detection.

In a possible implementation manner, the method further includes: calculating the intensity of the ambient light according to the first sampling data, when the first sampling data is valid.

In an embodiment of the present application, when it is determined that the current sampling data is valid according to the current main frequency and the standard main frequency, the intensity of the ambient light is directly calculated by using the current sampling data. By determining that the current sampling data is valid, it can be ensured that the current sampling data is sampling data in the case of no offset in the main frequency of the display screen. Using the sampling data to calculate the intensity of the ambient light can effectively avoid an ambient light detection error caused by the offset of the main frequency of the display screen, and further improve accuracy of the ambient light detection.

In a possible implementation manner, the determining whether the first sampling data is valid according to the current main frequency and the standard main frequency of the display screen includes: determining whether the first sampling data is valid according to a difference between the current main frequency and the standard main frequency, and determining that the first sampling data is invalid when the difference is greater than a first threshold; and determining that the first sampling data is valid when the difference is less than or equal to the first threshold.

In a possible implementation manner, the first threshold is 1 MHz.

In an embodiment of the present application, whether an offset in the main frequency of the display screen occurs can be judged according to a difference between the current main frequency and the standard main frequency. Specifically, the difference can be compared with the first threshold to determine whether the current sampling data is valid.

In a possible implementation manner, the determining whether the first sampling data is valid according to the current main frequency and the standard main frequency of the display screen includes: determining whether the first sampling data is valid according to a rate of change of the current main frequency and the standard main frequency, and determining that the first sampling data is invalid when the rate of change is greater than a second threshold; and determining that the first sampling data is valid when the rate of change is less than or equal to the second threshold.

In a possible implementation manner, the second threshold is 0.1%.

In a possible implementation manner, the method further includes: counting a number of clock cycles of the sensor in each vertical synchronization signal period of the display screen; and determining the current main frequency according to the number of clock cycles.

In an embodiment of the present application, a display can acquire a vertical synchronization signal of the display screen, so as to start sampling synchronously or sampling with a delay according to the vertical synchronization signal, and count a number of clock cycles of the sensor in each vertical synchronization signal period, and thus the current main frequency of the display screen is reflected according to the number of clock cycles of the sensor.

In a possible implementation manner, the standard main frequency is a number of clock cycles of the sensor in each vertical synchronization signal period of the display screen in a first environment, and the first environment is a dark room for calibrating screen light.

It should be understood that the dark room environment is generally a normal temperature environment, and it can be approximately considered that intensity of the ambient light is 0, and an offset in the main frequency of the display screen or the sensor does not occur due to the influence of temperature. In this case, only the display screen emits light, and a number of clock cycles of the sensor in each vertical synchronization signal period of the display screen is recorded, which can reflect the standard main frequency of the display screen according to the number of clock cycles of the sensor.

In a possible implementation manner, the adjusting the first sampling parameter as the second sampling parameter according to the current main frequency and the standard main frequency includes: adjusting a main frequency of the sensor in a same proportion according to a rate of change of the current main frequency and the standard main frequency.

In an embodiment of the present application, by adjusting a main frequency of the sensor, the main frequency of the sensor is made consistent with the main frequency of the display screen in terms of a relative change, and thus influence of the main frequency change of the display screen on the ambient light detection can be eliminated.

In a possible implementation manner, the adjusting the first sampling parameter as the second sampling parameter according to the current main frequency and the standard main frequency includes: adjusting a sampling frequency or a sampling position of the sensor in each vertical synchronization signal period of the display screen according to a rate of change of the current main frequency and the standard main frequency.

In an embodiment of the present application, on the one hand, by adjusting a sampling frequency of the sensor, the number of sampling times of the sensor in each vertical synchronization signal period is made consistent with that in the darkroom environment, so as to utilize frequency point energy of the display screen recorded in the darkroom environment to eliminate frequency point energy in the first sampling data that is corresponding to the frequency point in the dark room environment to achieve the purpose of eliminating interference of leaked light of the screen and improve accuracy of ambient light detection. On the other hand, adjusting a sampling position of the sensor can enable the sampling position of the sensor in each vertical synchronization signal period to change synchronously according to the main frequency change, so as to accurately collect data in the deepest part of a drop zone of the screen light intensity, that is, sampling data obtained when the screen is completely black. In this case, it can be approximated that the display screen does not emit light, and the collected ambient light data is not affected by leaked light of the screen or is minimally affected by leaked light of the screen, which improves accuracy of ambient light detection.

In a possible implementation manner, the adjusting the sampling frequency of the sensor in each vertical synchronization signal period of the display screen includes: adjusting a sampling duration of each sampling point in a same proportion according to the rate of change.

In a possible implementation manner, the adjusting the sampling position of the sensor in each vertical synchronization signal period of the display screen includes: adjusting a delayed sampling duration of the sensor with respect to the vertical synchronization signal in a same proportion according to the rate of change.

In an embodiment of the present application, according to the rate of change of the current main frequency and the standard main frequency, a sampling duration of the sensor or a delayed sampling duration relative to the vertical synchronization signal is adjusted in a same proportion, and a sampling frequency and a sampling position of the sensor can be accurately adjusted according to the main frequency of the current display screen, so as to accurately eliminate an ambient light detection offset caused by the main frequency change of the display screen, and further improve the accuracy of the ambient light detection.

In a second aspect, provided is an apparatus for detecting ambient light under a display screen, where the apparatus includes: a sensor, where the sensor is configured to collect first sampling data according to a first sampling parameter, or configured to collect second sampling data according to a second sampling parameter; and a processor, where the processor is configured to acquire the first sampling data; acquire a current main frequency of the display screen; determine whether the first sampling data is valid according to the current main frequency and a standard main frequency of the display screen; adjust the first sampling parameter as a second sampling parameter according to the current main frequency and the standard main frequency, when the first sampling data is invalid; acquire the second sampling data; and determine intensity of the ambient light according to the second sampling data.

In a possible implementation manner, the processor is further configured to: calculate the intensity of the ambient light according to the first sampling data, when the first sampling data is valid.

In a possible implementation manner, the processor is configured to: determine whether the first sampling data is valid according to a difference between the current main frequency and the standard main frequency, and determine that the first sampling data is invalid when the difference is greater than a first threshold; and determine that the first sampling data is valid when the difference is less than or equal to the first threshold.

In a possible implementation manner, the processor is configured to: determine whether the first sampling data is valid according to a rate of change of the current main frequency and the standard main frequency, and determine that the first sampling data is invalid when the rate of change is greater than a second threshold; and determine that the first sampling data is valid when the rate of change is less than or equal to the second threshold.

In a possible implementation manner, the processor is configured to: count a number of clock cycles of the sensor in each vertical synchronization signal period of the display screen; and determine the current main frequency according to the number of clock cycles.

In a possible implementation manner, the standard main frequency is a number of clock cycles of the sensor in each vertical synchronization signal period of the display screen in a first environment, and the first environment is a dark room for calibrating screen light.

In a possible implementation manner, the processor is configured to adjust a main frequency of the sensor in a same proportion according to a rate of change of the current main frequency and the standard main frequency.

In a possible implementation manner, the processor is configured to adjust a sampling frequency or a sampling position of the sensor in each vertical synchronization signal period of the display screen according to a rate of change of the current main frequency and the standard main frequency.

In a third aspect, provided is an electronic device, including: a display screen; and the apparatus for detecting ambient light according to the second aspect and any possible implementation manner of the second aspect, where the apparatus is disposed under the display screen to implement ambient light detection.

DESCRIPTION OF EMBODIMENTS

Technical solutions in embodiments of the present application will be described hereinafter with reference to the accompanying drawings.

It should be understood that terms used in embodiments of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

It should be understood that "one embodiment" or "an embodiment" mentioned throughout the specification means that particular features, structures, or characteristics in connection with the embodiment are included in at least one embodiment of the present application. Therefore, "in one embodiment" or "in an embodiment" appeared throughout the specification does not necessarily mean a same embodiment. Further, the particular features, structures or characteristics may be combined in any suitable manner in one or more embodiments. It should be understood that sequence numbers of the foregoing processes do not mean execution sequences in the embodiments of the present application. The execution sequences of the processes should be determined based on functions and internal logic of the processes, and should not be construed as any limitation on the implementation processes of the embodiments of the present application.

In order to achieve a full screen and a larger screen-to-body ratio, a sensor originally disposed next to a display screen, such as a fingerprint identification sensor and a light sensor, is gradually transferred to be under the screen to save space outside the display screen. A light sensor is originally disposed above a screen to detect intensity of ambient light, so that an electronic device can adjust brightness of the display screen or implement other functions. For a light sensor disposed under a screen, since the display screen can emit light, the light sensor will not only receive ambient light, but also receive a part of leaked light of the display screen, that is, light received by the light sensor disposed under the screen is a sum of the ambient light and the leaked light of the display screen. Therefore, for ambient light detection under a display screen, how to eliminate interference of leaked light of the display screen on the ambient light detection determines accuracy and reliability of the ambient light detection.

The following are two methods for ambient light detection under a display screen so as to eliminate interference of leaked light of the display screen.

I. Spectrum Analysis Method

Figure 1:
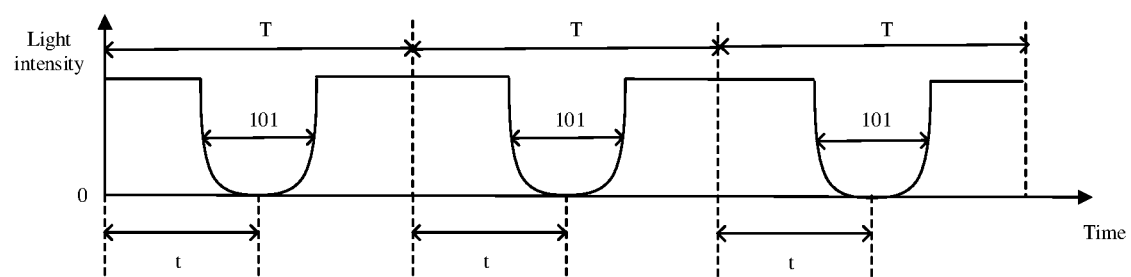
FIG. 1 is a graph of screen light according to the present application.

Screen light emitted by a display screen can be regarded as a set of continuous periodic signals, and a sensor can acquire time domain information of the periodic signals by continuously sampling the screen light. Exemplarily, the screen light can be represented by a graph as shown in FIG. 1, where y axis is screen light intensity, and x axis is time. In FIG. 1, a screen light intensity of a display screen is represented as 0 periodically. In this case, the display screen can be approximately regarded as not emitting light. A zone where the screen light intensity changes from a peak value to 0 and then returns to the peak value is a drop zone 101 (or a black frame zone). The presence of the drop zone 101 is due to the fact that the display screen is not emitting light continuously, but is turned on and off constantly. When it is turned on and off alternately fast enough, naked eyes will think that the display screen is always emitting light.

Figure 2:
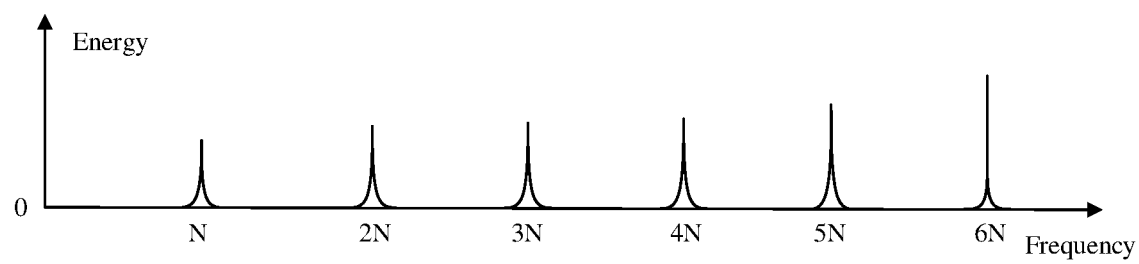
FIG. 2 is a spectrum distribution diagram of screen light according to the present application.

According to spectrum analysis, distribution of screen light on a spectrum is obtained by converting the above time domain information into frequency domain information. As shown in FIG. 2, it is a spectrum distribution curve of screen light, where y axis is energy of the screen light, and x axis is frequency. Since the screen light is a periodic light signal, the screen light has an energy value at a fixed frequency point (for example, N, 2N, 3N . . . ). Spectrum analysis method is to obtain energy values of screen light at fixed frequency points by continuously sampling the screen light, and then cancel the energy values of these frequency points in a calculation process of detecting ambient light to eliminate influence of the screen light on the ambient light detection, so as to eliminate interference of leaked light of the display screen in the ambient light detection.

II. Drop Zone Collection Method

It can be known from the above spectrum analysis method that there is a drop zone 101 for screen light of a display screen. Drop zone collection method refers to collecting ambient light data in the deepest part of the drop zone 101 of the screen light. The deepest part of the drop zone 101 is a place where the screen light intensity is closest to 0. In this case, the display screen hardly emits light. It can be approximated that there is no screen light in a light signal collected in this case. Therefore, ambient light data collected in the drop zone 101 is not affected by the screen light interference or is minimally affected by the screen light interference, and intensity of ambient light can be directly obtained by calculating the collected data in the drop zone 101, so as to eliminate influence of leaked light of the display screen on ambient light detection.

Although the above two methods can both eliminate influence of leaked light of a display screen on ambient light detection, in an actual application process, a main frequency of a display screen or a main frequency of a sensor may be affected by a factor such as temperature, which results in an offset of the main frequency of the display screen or the sensor occurs, that is, a frequency offset occurs. For the display screen, the frequency offset will cause a periodic offset in screen light emitted by the display screen. For the sensor, the frequency offset will cause a periodic offset in a sampling frequency or a sampling point position of the sensor. After the frequency offset occurs, if the sensor is still sampled and calculated according to a sampling parameter obtained before the frequency offset, a frequency offset error will be introduced, which results in that the screen light cannot be completely eliminated, and calculated ambient light data is still affected by the screen light to a certain extent.

By taking the above spectrum analysis method as an example, after a frequency offset occurs, an offset in distribution of screen light on a spectrum will also occur accordingly, and an offset in frequency points where screen light energy values exist will also occur accordingly. In this case, if a sensor still cancels an energy value of a fixed frequency point at the original fixed frequency point (N, 2N, 3N . . . ), actual screen light is not eliminated, so that calculated ambient light data still includes data of the screen light, and accuracy of ambient light detection is affected.

By taking the above drop zone collection method as an example, after a frequency offset occurs, an offset in distribution of screen light on a spectrum will occur accordingly, and an offset in position of a drop zone 101 on the spectrum will also occur accordingly. In this case, if a sensor still collects ambient light data at the position of the original drop zone 101, an actually collected light signal is still a sum of ambient light and screen light, and finally calculated ambient light data still includes screen light data, which affects accuracy of ambient light detection.

Based on this, the present application provides a method for detecting ambient light under a display screen, which can monitor whether an offset in a main frequency of the display screen or a main frequency of a sensor occurs in real time, and dynamically adjust sampling parameters of the sensor in time when the frequency offset occurs, so as to eliminate interference of screen light on ambient light detection and improve accuracy of the ambient light detection.

It should be understood that the present application uses the spectrum analysis method and the drop zone collection method as examples to explain how to eliminate screen light interference, but the method for eliminating screen light interference in an embodiment of the present application is not limited thereto.

Figure 3:
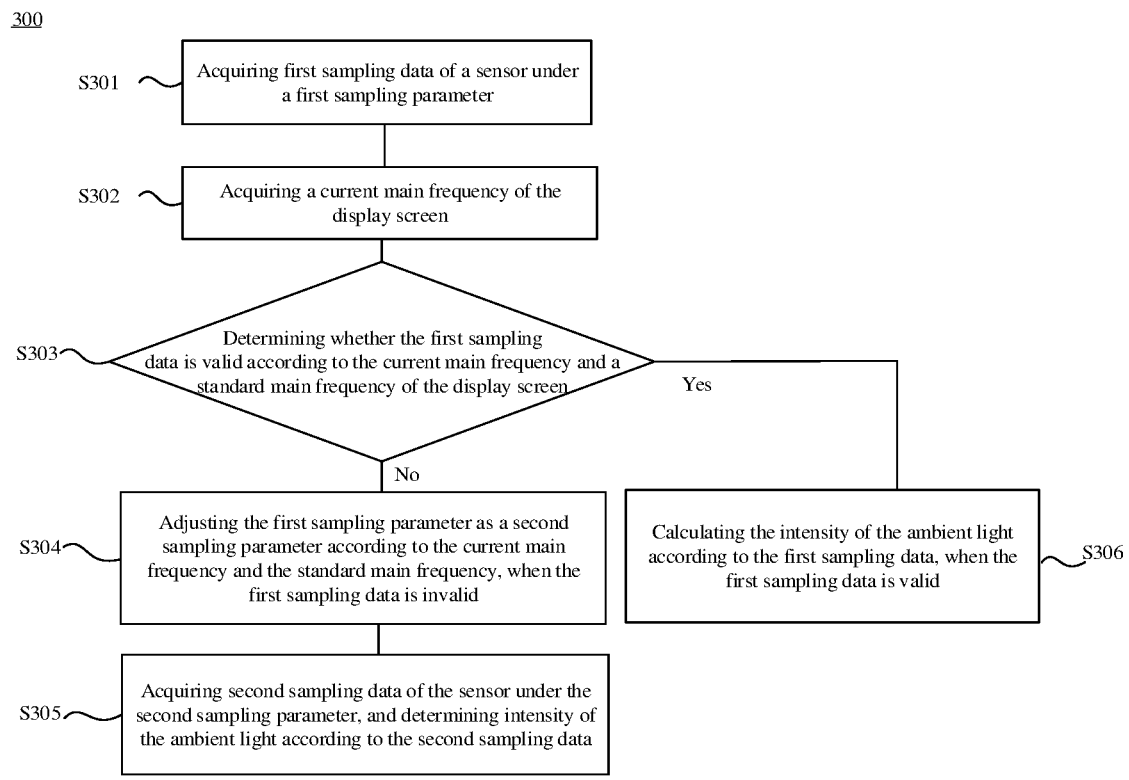
FIG. 3 is a schematic flowchart of a method for detecting ambient light under a display screen according to the present application.

FIG. 3 is a schematic flowchart of a method 300 for detecting ambient light under a display screen according to an embodiment of the present application. The method 300 includes:

S301: acquiring first sampling data of a sensor under a first sampling parameter;

S302: acquiring a current main frequency of the display screen;

S303: determining whether the first sampling data is valid according to the current main frequency and a standard main frequency of the display screen;

S304: adjusting the first sampling parameter as a second sampling parameter according to the current main frequency and the standard main frequency, when the first sampling data is invalid; and S305: acquiring second sampling data of the sensor under the second sampling parameter, and determining intensity of the ambient light according to the second sampling data.

Specifically, sampling parameters of a sensor include a current main frequency of the sensor, a sampling frequency of the sensor, a sampling position of the sensor, and the like. A standard main frequency of a display screen is a main frequency of the display screen in a first environment. The first environment refers to a dark room environment for calibrating screen light. The dark room environment is usually a normal temperature environment, and intensity of the ambient light can be approximately 0. The standard main frequency of the display screen can be pre-stored data in an electronic device.

In the embodiment of the present application, an apparatus for detecting ambient light is connected to a signal line of the display screen. Based on this, the apparatus for detecting ambient light can obtain the current main frequency of the display screen, and compare it with the standard main frequency of the display screen to judge whether an offset in the main frequency of the display screen occurs. If the offset occurs, it is determined that current sampling data, that is, first sampling data, is invalid data, and second sampling data is collected by adjusting the sampling parameters of the sensor according to the current main frequency and the standard main frequency, and the second sampling data is data collected after adjusting the sampling parameters according to the frequency offset. And the frequency offset is corrected by adjusting the sampling parameters, so that intensity of the ambient light calculated by using the second sampling data is data obtained after interference of screen light is eliminated.

In this embodiment, the offset of the main frequency of the display screen is corrected by adjusting the sampling parameters, so as to avoid an ambient light detection error caused by the offset, and thus improve accuracy of the ambient light detection.

Optionally, as shown in FIG. 3, the method 300 further includes:

S306, calculating the intensity of the ambient light according to the first sampling data, when the first sampling data is valid.

Specifically, in the case of judging whether the offset in the main frequency of the display screen occurs according to the current main frequency and the standard main frequency of the display screen, if no offset occurs, it is determined that the current sampling data, that is, the first sampling data, is valid data. The first sampling data in this case is confirmed to have no frequency offset error, so that the intensity of ambient light calculated by using the first sampling data is data obtained after interference of screen light is eliminated.

In this embodiment, by determining that the current sampling data is valid, it can be ensured that the current sampling data is sampling data in the case of no offset in the main frequency of the display screen. Using the sampling data to calculate the intensity of the ambient light can effectively avoid an ambient light detection error caused by the offset of the main frequency of the display screen, and further improves the accuracy of the ambient light detection.

Optionally, in S303, whether the first sampling data is valid is determined according to a difference between the current main frequency and the standard main frequency, and when the difference is greater than a first threshold, it is determined that the first sampling data is invalid; and when the difference is less than or equal to the first threshold, it is determined that the first sampling data is valid.

It should be understood that the first threshold may be an average value obtained after collecting statistics about frequency offset data of the display screen for multiple times to calculate the difference between the current main frequency and the standard main frequency for multiple times, or may be a preset value. In this embodiment, when the difference is greater than 1 MHz, it is determined that the first sampling data is invalid; and when the difference is less than or equal to 1 MHz, it is determined that the first sampling data is valid. It can be understood that, in other embodiments, the difference can be adjusted according to requirements, and the difference can be set to a smaller value.

In this embodiment, the difference between the current main frequency and the standard main frequency can be used to judge whether the first sampling data is valid. The judgment method can be implemented without a complex algorithm, which can improve efficiency of judging whether the display screen has a frequency offset, so that the sensor can collect valid data as soon as possible so as to help improve the accuracy of ambient light detection.

Optionally, in S303, whether the first sampling data is valid is determined according to a ratio of an absolute value of the difference between the current main frequency and the standard main frequency to the standard main frequency, and when a rate of change is greater than a second threshold, it is determined that the first sampling data is invalid; and when the rate of change is less than or equal to the second threshold, it is determined that the first sampling data is valid.

Specifically, the ratio is the rate of change of the current main frequency compared to the standard main frequency. The second threshold may be an average value obtained by calculating the rate of change of the current main frequency relative to the standard main frequency for multiple times after collecting statistics about frequency offset data of the display screen for multiple times, or may be a preset value. In this embodiment, when the rate of change is greater than 0.1%, it is determined that the first sampling data is invalid; and when the rate of change is less than or equal to 0.1%, it is determined that the first sampling data is valid. It can be understood that, in other embodiments, the rate of change can be adjusted according to requirements, and the rate of change can be set to a smaller value. For example, when the rate of change is less than or equal to 0.03%, it is determined that the first sampling data is valid.

In this embodiment, the rate of change of the current main frequency compared to the standard main frequency is used to judge whether the first sampling parameter is valid. The method can be implemented without a complex algorithm, which can improve efficiency of judging whether the display screen has a frequency offset, so that the sensor can collect valid data as soon as possible so as to help improve the accuracy of ambient light detection.

Optionally, in S302, a number $m_1$ of clock cycles of the sensor in each vertical synchronization signal (VSync) period of the display screen is counted; and the current main frequency is determined according to the number $m_1$ of clock cycles.

The display screen usually emits light at a certain frequency to refresh a frame of image content, and the vertical synchronization signal is a synchronization signal for the display screen to refresh a frame of image content. Two adjacent vertical synchronization signals constitute a vertical synchronization signal period, as shown by T in FIG. 1, and the vertical synchronization signal period T of the display screen can reflect the current main frequency of the display screen.

Specifically, the sensor is connected to the signal line of the display screen so that the apparatus for detecting ambient light can acquire the vertical synchronization signal of the display screen, and thus perform sampling based on the vertical synchronization signal. For example, the sensor can start sampling immediately after receiving the vertical synchronization signal, or start sampling with a delay after receiving the vertical synchronization signal. The sensor has a corresponding clock cycle at its current main frequency. The apparatus for detecting ambient light in the embodiment of the present application further has a counting module for counting the number of clock cycles of the sensor in each vertical synchronization signal period T, and the counting can be used to reflect the current main frequency of the display screen, so that the apparatus for detecting ambient light can compare the current main frequency with the standard main frequency of the display screen.

Optionally, in S303, the standard main frequency is a number $m_0$ of clock cycles of the sensor in each vertical synchronization signal period T of the display screen in the first environment.

Specifically, in a dark room environment, the number $m_0$ of clock cycles of the sensor in each vertical synchronization signal period T of the display screen is recorded. Since the main frequency of the display screen is a standard main frequency without offset in this case, the number $m_0$ of clock cycles of the sensor in the vertical synchronization signal period T that is corresponding to the standard main frequency can reflect the standard main frequency of the display screen.

Preferably, in S304, the main frequency of the sensor is adjusted in a same proportion according to the rate of change of the current main frequency and the standard main frequency.

Preferably, in S304, a sampling frequency or a sampling position of the sensor in each vertical synchronization signal period T of the display screen is adjusted according to the rate of change of the current main frequency and the standard main frequency.

Specifically, according to the rate of change, a sampling duration of the sensor or a delayed sampling duration of the sensor with respect to the vertical synchronization signal is adjusted in the same proportion. Adjusting the sampling duration of the sensor can adjust the sampling frequency of the sensor. The sensor starts sampling after first time after receiving the synchronization signal, the first time is a delayed sampling duration of the sensor with respect to the vertical synchronization signal, and adjusting the delayed sampling duration can adjust the sampling position of the sensor.

The specific process of adjusting sampling parameters according to the method for detecting ambient light of the present application is demonstrated below by respectively taking the spectrum analysis method and the drop zone collection method as examples.

Spectrum Analysis Method

A sensor starts sampling immediately after receiving a vertical synchronization signal, and then on a screen light spectrum of a display screen, a minimum frequency resolution can be represented as $f_0$, $f_0 = f_s/n$, where n is the number of sampling points of the sensor, and $f_s$ is a sampling frequency of the sensor. In a case that the number of sampling points is definite, a frequency point f that reflects light energy of the screen can be represented by $f_s$, that is, $f = k * f_s$, where k is a constant. That is, $k = f/f_s$, and in any scenario, the constant k remains unchanged. Therefore, when an offset in a main frequency of the display screen occurs, that is, after f changes, the sampling frequency $f_s$ of the sensor can be adjusted in a same proportion according to the change off to keep k unchanged. Therefore, the sensor can still achieve the purpose of eliminating leaked light interference of the display screen by cancelling the energy of the fixed frequency point before the main frequency of the display screen changes.

Specifically, adjusting the sampling frequency $f_s$ of the sensor can be realized by adjusting a main frequency of the sensor or a duration of a sampling point of the sensor, where the duration of the sampling point is a duration of the sensor at each sampling point.

Drop Zone Collection Method

A sensor starts sampling after first time after receiving a vertical synchronization signal, as shown by t in FIG. 1, and the first time t enables the sensor to collect data in the deepest part of a drop zone 101. For example, in a first environment, a delayed sampling duration to from the deepest part of the drop zone 101 after receiving the vertical synchronization signal is recorded as a delayed sampling duration under a standard main frequency. When the display screen has a frequency offset, a position of the deepest part of the drop zone 101 will also change correspondingly, and the duration from receiving the vertical synchronization signal will also change. In this case, by adjusting a sampling position of the sensor, the sensor can still accurately collect data in the deepest part of the drop zone 101, so as to achieve the purpose of calculating ambient light intensity using the data that is not affected by the screen light.

Specifically, adjusting the sampling position of the sensor can be realized by adjusting the main frequency of the sensor or the delayed sampling duration of the sensor in each vertical synchronization signal period T, and the adjusted delayed sampling duration $t_1 = m_1/m_0 * t_0$.

It should be understood that the embodiment of the present application takes the change of the main frequency of the display screen as a specific example, but the method described in the present application is also applicable to a frequency offset error caused by the change of the main frequency of the sensor.

The method for detecting ambient light of the present application can monitor a relative change of a main frequency of a display screen and a sensor, so as to dynamically adjust sampling parameters of the sensor according to the change, correct a frequency offset error caused by the change of the main frequency, avoid influence of the frequency offset error on ambient light detection, and improve accuracy of the ambient light detection.

Figure 4:
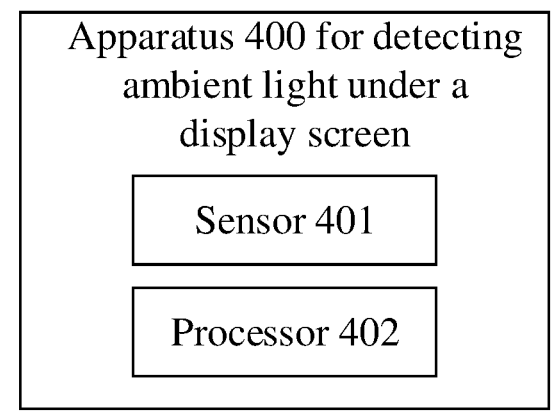
FIG. 4 is a schematic structural diagram of an apparatus for detecting ambient light under a display screen according to the present application.

The present application further provides an apparatus 400 for detecting ambient light under a display screen. As shown in FIG. 4, the apparatus 400 includes:

- a sensor 401 configured to collect first sampling data according to a first sampling parameter, or configured to collect second sampling data according to a second sampling parameter; and
- a processor 402 configured to obtain the first sampling data; obtain a current main frequency of the display screen; determine whether the first sampling data is valid according to the current main frequency and a standard main frequency of the display screen; adjust the first sampling parameter as a second sampling parameter according to the current main frequency and the standard main frequency, when the first sampling data is invalid; acquire the second sampling data; and determine intensity of the ambient light according to the second sampling data.

Optionally, the processor 402 is further configured to: calculate the intensity of the ambient light according to the first sampling data, when the first sampling data is valid.

Optionally, the processor 402 is configured to: determine whether the first sampling data is valid according to a difference between the current main frequency and the standard main frequency, and determine that the first sampling data is invalid when the difference is greater than a first threshold; and determine that the first sampling data is valid when the difference is less than or equal to the first threshold.

Optionally, the processor 402 is configured to: determine whether the first sampling data is valid according to a rate of change of the current main frequency and the standard main frequency, and determine that the first sampling data is invalid when the rate of change is greater than a second threshold; and determine that the first sampling data is valid when the rate of change is less than or equal to the second threshold.

Optionally, the processor 402 is configured to: count a number of clock cycles of the sensor in each vertical synchronization signal period T of the display screen; and determine the current main frequency according to the number of clock cycles.

Optionally, the standard main frequency is a number of clock cycles of the sensor in each vertical synchronization signal period T of the display screen in a first environment, and the first environment is a dark room for calibrating screen light.

Optionally, the processor 402 is configured to adjust a main frequency of the sensor in a same proportion according to a rate of change of the current main frequency and the standard main frequency.

Optionally, the processor 402 is configured to adjust a sampling duration or a sampling position of the sensor in each vertical synchronization signal period T of the display screen according to a rate of change of the current main frequency and the standard main frequency.

To sum up, an apparatus for detecting ambient light under a display screen provided in an embodiment of the present application is configured to implement the corresponding method for detecting ambient light in the foregoing method embodiment, and has the beneficial effects of the corresponding method embodiment, and details are not described herein.

The processor 402 described in the embodiment of the present application may include one or more processing cores. The processor 402 is connected to the sensor 401 by using various interfaces and lines, and runs or executes an instruction, a program, a code set or an instruction set stored in a memory and invokes data stored in a memory, to perform various functions and data processing of the apparatus 400.

Optionally, the processor 402 may use at least one of a hardware form of a digital signal processing (DSP), a field-programmable gate array (FPGA), and a programmable logic array (PLA) for implementation. The processor 402 may integrate one or a combination of a central processing unit (CPU), an ambient light detector (Graphics Processing Unit, GPU), a modem, and the like.

The sensor 401 may be any light sensing device used for collecting light for light intensity detection, and the specific light sensing sensor is not limited here.

Figure 5:
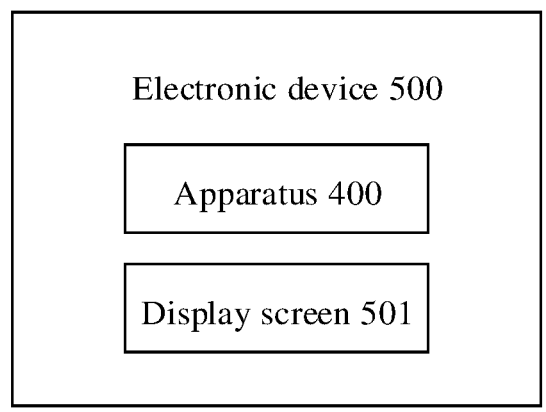
FIG. 5 is a schematic structural diagram of an electronic device according to the present application.

The present application further provides an electronic device 500. As shown in FIG. 5, the electronic device 500 includes:

- a display screen 501; and
- the apparatus 400 for detecting ambient light that is disposed under the display screen 501 to implement ambient light detection.

By way of example and not limitation, the electronic device 500 in the embodiment of the present application may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a device such as a smart watch or smart glasses, that is of a full function and a large size and that can implement all or some functions without relying on a smart phone, and a device such as a smart wristband or smart jewelry that performs sign monitoring, that only focus on one type of application function and that needs to cooperate with other devices such as a smart phone.

The display screen 501 may be configured to display information input by or provided to the user and various graphical user interfaces of the electronic device, which may be composed of images, text, icons, videos, and any combination thereof. In some embodiments, the processor 402 may obtain the detected light intensity value according to the light received by the sensor 401. Then, the processor 402 may determine the current ambient light intensity value according to the detected light intensity value, and adjust the brightness of the display screen 501 according to the current ambient light intensity value.

Optionally, the display screen 501 may be an OLED display screen. Specifically, an organic light-emitting diode (OLED) display screen has good light transmittance and can pass visible light. Therefore, the OLED display screen does not affect the sensor 401 to receive visible light when the content effect is displayed. It should be understood that the OLED display screen is only used as an example, and the embodiments of the present application are not limited thereto.

It should be noted that, in a case of no conflict, the various embodiments and/or the technical features in the various embodiments described in the present application may be combined with each other arbitrarily, and the technical solutions obtained after the combination should also fall within the protection scope of the present application.

The apparatus and method disclosed in the embodiments of the present application may be implemented in other manners. For example, some features of the method embodiments described above can be ignored or not implemented. The apparatus embodiments described above are merely exemplary. The division of the units is merely a logic function division, other division manners may exist in practical implementation. A plurality of units or components may be combined or integrated to another system. In addition, coupling between various units or coupling between various components may be direct coupling or indirect coupling, and the foregoing coupling includes a connection in electrical, mechanical or other forms.

The modules described as separate parts in the present application may or may not be physically separate, and parts displayed as modules may or may not be physical modules. In addition, the function modules in the embodiments of the present application may be integrated into one processing unit, or each of the modules may exist alone physically, or two or more modules may be integrated into one unit.

The foregoing description is only a specific implementation manner of the present application. The protection scope of the present application, however, is not limited thereto. Various modifications or replacements may be readily conceivable to any person skilled in the art within the technical scope disclosed in the present application, and such modifications or replacements shall fall within the protection scope of the present application. Therefore, the protection scope of this application shall be subject to the protection scope of the claims.

What is claimed is:

1. A method for detecting ambient light under a display screen, wherein the method comprises:
   collecting a first sampling data of the ambient light according to a first sampling parameter by a sensor;
   wherein the sampling parameter comprises a current main frequency of the sensor, a sampling frequency of the sensor, and a sampling position of the sensor;
   acquiring the first sampling data of the sensor by a processor;
   acquiring a current main frequency of the display screen by the processor;
   determining whether the first sampling data is valid according to the current main frequency and a standard main frequency of the display screen by the processor;
   adjusting the first sampling parameter as a second sampling parameter according to the current main frequency and the standard main frequency by the processor, when the first sampling data is invalid;
   collecting a second sampling data of the ambient light according to a second sampling parameter by the sensor;
   acquiring the second sampling data of the sensor by the processor; and
   determining intensity of the ambient light according to the second sampling data by the processor;
   whether the first sampling data is valid according to the current main frequency and the standard main frequency of the display screen comprises:
   determining whether the first sampling data is valid according to a difference between the current main frequency and the standard main frequency, and determining that the first sampling data is invalid when the difference is greater than a first threshold; and
   determining that the first sampling data is valid when the difference is less than or equal to the first threshold;
   or
   determining whether the first sampling data is valid according to a rate of change of the current main frequency and the standard main frequency, and determining that the first sampling data is invalid when the rate of change is greater than a second threshold; and
   determining that the first sampling data is valid when the rate of change is less than or equal to the second threshold;
   wherein the method further comprises:
   counting a number of clock cycles of the sensor in each vertical synchronization signal period of the display screen by the processor; and
   determining the current main frequency according to the number of clock cycles by the processor;
   wherein the standard main frequency is a number of clock cycles of the sensor in each vertical synchronization signal period of the display screen in a first environment, and the first environment is a dark room for calibrating screen light.

2. The method according to claim 1, wherein the method further comprises:
   calculating the intensity of the ambient light according to the first sampling data, when the first sampling data is valid.

3. The method according to claim 1, wherein the first threshold is 1 MHz.

4. The method according to claim 1, wherein the second threshold is 0.1%.

5. The method according to claim 1, wherein the adjusting the first sampling parameter as the second sampling parameter according to the current main frequency and the standard main frequency comprises:

adjusting a main frequency of the sensor in a same proportion according to a rate of change of the current main frequency and the standard main frequency.

6. The method according to claim 1, wherein the adjusting the first sampling parameter as the second sampling parameter according to the current main frequency and the standard main frequency comprises:
adjusting a sampling frequency or a sampling position of the sensor in each vertical synchronization signal period of the display screen according to a rate of change of the current main frequency and the standard main frequency.

7. The method according to claim 6, wherein the adjusting the sampling frequency of the sensor in each vertical synchronization signal period of the display screen comprises:
adjusting a sampling duration of each sampling point in a same proportion according to the rate of change.

8. The method according to claim 6, wherein the adjusting the sampling position of the sensor in each vertical synchronization signal period of the display screen comprises:
adjusting a delayed sampling duration of the sensor with respect to the vertical synchronization signal in a same proportion according to the rate of change.

9. An apparatus for detecting ambient light under a display screen, wherein the apparatus comprises:
a sensor, wherein the sensor is configured to collect first sampling data of the ambient light according to a first sampling parameter, or configured to collect second sampling data of the ambient light according to a second sampling parameter; wherein the sampling parameter comprises a current main frequency of the sensor, a sampling frequency of the sensor, and a sampling position of the sensor; and
a processor, wherein the processor is configured to acquire the first sampling data; acquire a current main frequency of the display screen; determine whether the first sampling data is valid according to the current main frequency and a standard main frequency of the display screen; adjust the first sampling parameter as a second sampling parameter according to the current main frequency and the standard main frequency, when the first sampling data is invalid; acquire the second sampling data; and determine intensity of the ambient light according to the second sampling data;
wherein the processor is configured to:
determine whether the first sampling data is valid according to a difference between the current main frequency and the standard main frequency, and
determine that the first sampling data is invalid when the difference is greater than a first threshold; and
determine that the first sampling data is valid when the difference is less than or equal to the first threshold;
or
determine whether the first sampling data is valid according to a rate of change of the current main frequency and the standard main frequency, and
determine that the first sampling data is invalid when the rate of change is greater than a second threshold; and
determine that the first sampling data is valid when the rate of change is less than or equal to the second threshold;
wherein the processor is configured to:
count a number of clock cycles of the sensor in each vertical synchronization signal period of the display screen; and determine the current main frequency according to the number of clock cycles;
wherein the standard main frequency is a number of clock cycles of the sensor in each vertical synchronization signal period of the display screen in a first environment, and the first environment is a dark room for calibrating screen light.

10. The apparatus according to claim 9, wherein the processor is further configured to:
calculate the intensity of the ambient light according to the first sampling data, when the first sampling data is valid.

11. The apparatus according to claim 9, wherein the processor is configured to adjust a main frequency of the sensor in a same proportion according to a rate of change of the current main frequency and the standard main frequency;
or
the processor is configured to adjust a sampling frequency or a sampling position of the sensor in each vertical synchronization signal period of the display screen according to a rate of change of the current main frequency and the standard main frequency.

12. An electronic device, comprising:
a display screen; and
the apparatus for detecting ambient light according to claim 9, wherein the apparatus is disposed under the display screen to implement ambient light detection.

* * * * *